(12) United States Patent
Bäbler

(10) Patent No.: US 6,800,127 B2
(45) Date of Patent: Oct. 5, 2004

(54) PIGMENT PREPARATIONS

(75) Inventor: Fridolin Bäbler, Hockessin, DE (US)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 10/425,145

(22) Filed: Apr. 29, 2003

(65) Prior Publication Data

US 2004/0030010 A1 Feb. 12, 2004

Related U.S. Application Data

(60) Provisional application No. 60/377,087, filed on May 1, 2002.

(51) Int. Cl.$^7$ .................................................. C08K 5/16
(52) U.S. Cl. ............... 106/493; 106/31.75; 106/170.42; 106/200.3; 106/410; 106/419; 106/432; 106/452; 106/459; 106/460; 106/479; 106/480; 106/494; 106/495; 106/496; 106/497; 106/498; 106/499; 428/403; 428/404; 428/407; 524/186
(58) Field of Search ........................ 106/31.75, 170.42, 106/200.3, 410, 419, 432, 452, 459, 460, 479, 480, 493, 494, 495, 496, 497, 498, 453, 455, 476, 499; 196/499; 428/403, 404, 407; 524/186

(56) References Cited

U.S. PATENT DOCUMENTS

| | | | | |
|---|---|---|---|---|
| 3,011,904 A | * | 12/1961 | Pickett et al. ................ 427/196 |
| 3,255,148 A | * | 6/1966 | Sievenpiper et al. ........ 523/332 |
| 4,069,184 A | * | 1/1978 | Ferraro et al. .............. 524/602 |
| 4,075,369 A | * | 2/1978 | Ferraro et al. .............. 427/185 |
| 4,146,704 A | * | 3/1979 | Seki et al. ................... 528/323 |
| 4,387,184 A | * | 6/1983 | Coquard et al. ............ 525/183 |
| 5,041,259 A | | 8/1991 | Fujii et al. ................... 264/349 |
| 5,231,119 A | | 7/1993 | Govoni et al. .............. 523/221 |
| 5,407,985 A | * | 4/1995 | Smith .......................... 524/238 |
| 5,997,627 A | | 12/1999 | Bäbler ...................... 106/493 |
| 6,579,529 B2 | * | 6/2003 | Gers-Barlag et al. ....... 424/401 |

FOREIGN PATENT DOCUMENTS

| | | | |
|---|---|---|---|
| EP | 1086984 | | 3/2001 |
| FR | 2156414 A | * | 5/1973 |
| GB | 1143258 | | 2/1969 |
| WO | 99/52909 | | 10/1999 |
| WO | 02/092681 | | 11/2002 |
| WO | 03/010230 | | 2/2003 |

* cited by examiner

Primary Examiner—Anthony J. Green
(74) Attorney, Agent, or Firm—Tyler A. Stevenson

(57) ABSTRACT

The present invention relates to pigment preparations comprising polyamide particles with an average particle size of below 50 μm and a pigment of an average particle size below 0.2 μm. The inventive pigment preparations are useful for coloring high molecular weight material, like coatings, inks and in particular plastics like polyvinyl chloride, polyamide, polyester, polycarbonate and, especially polyamide fibers.

26 Claims, No Drawings

PIGMENT PREPARATIONS

This application claims the benefit of U.S. Provisional Application No. 60/377,087, filed May 1, 2002.

SUMMARY

The present invention relates to new pigment preparations and a method of using the pigment preparations to color various substrates like high molecular weight material.

BACKGROUND

Due to unusually good mechanical properties, such as toughness, pliability, elasticity, and mechanical strength, polyamides belong to a class of high performance polymers with significant technical importance.

Polyamides pertain to the polar polymers with a high melting point of generally above 250° C. Only high performance pigments with outstanding heat stability can be used for coloring polyamides in the extrusion process. Since few organic pigments possess the properties needed to color polyamide, the availability of shades is limited. For this reason, large quantities of polyamide fibers are still bath dyed using special dyes like for example the acid dyes.

To increase the color strength and color uniformity organic pigments are typically applied into polyamide substrates by using specific pigment preparations. Such pigment preparations are prepared by incorporating the organic pigment into a polyamide compatible high molecular weight resin for example by a kneader process when a pigment crude is used as a starting material or when using a finished small particle size pigment by simply extrusion of a polymer/pigment blend to a wire followed by granulation. The resulting pigment preparation granules contain up to 50% of an organic pigment and are easily dispersible when applied in nylon.

The above method has the disadvantage that the pigment is exposed to a heat treatment twice: A) during the pigment preparation process and B) during the final application process. Many pigments suffer under such drastic conditions and change the hue and loose on chroma.

Surprisingly, it was found a new method by which pigment preparations for polyamide or other appropriate polar high performance plastics can be obtained without an extrusion step. Thus, avoiding a heat exposure above 100° C. during the pigment preparation process. The new method consists of a simple wet blending of small particle size pigments with specific polyamide fillers. The new pigment preparation is a uniform physical blend of pigment and polyamide filler which can be used effectively for coloring high molecular weight material like inks, coatings and plastics, especially plastics formed or shaped by the extrusion process.

Thus, the present invention relates to a process for the preparation of new pigment preparations by wet blending an ultra fine polyamide powder with small particle size organic pigments and its use as a pigmentary composition. The new pigment preparations have unique properties and can be used for the coloration of a variety of substrates. For example they allow the coloring of polyamide fibers in various shades currently obtained only by the environmentally unfriendly and uneconomic aqueous dyeing processes using an environmentally friendlier melt spinning process.

Many patents describe the dyeing of polyamide materials with dyes, in particular with acid dyes. For example U.S. Pat. No. 3,619,123 describes a process for dyeing synthetic polyamide fibers in the presence of one or more aromatic sulfonic acids to produce uniform dyed fibers. U.S. Pat. No. 4,438,140 describes salts of acid colorants and specified copolymers containing tertiary amino groups for its use in cosmetics. U.S. Pat. No. 6,136,433 describes melt-spinning a nylon fiber from a host polymer formed from a mixture of amide monomers and at least one hindered piperidine compound. A colorant is dispersed throughout the host polymer.

U.S. Pat. No. 4,374,641 describes a polymeric color concentrate for thermoplastic polymeric materials and solution dyeing of a nylon fiber. The color concentrate is prepared from a blend of a water- or organic solvent-dispersible polymer and a soluble dye or pigment. The preferred polymer is a polyamide blend with a polyamide component having improved basic dye affinity, as described in U.S. Pat. No. 3,846,507.

U.S. Pat. No. 4,492,686 claims cosmetic make-up compositions containing one or more colored pigments in a carrier or diluent, wherein the pigment is a salt obtained by reacting a polymer containing primary or secondary amine groups with at least 10% of the stoichiometric amount of an acid dyestuff as free acid or salt.

Japanese Patent No. 60/162,881 describes shaped goods comprising of a polyamide and melamine derivative by immersing the shaped goods in an aqueous solution containing 0.1 to 1.5 wt. % of acetic or formic acid or ammonium sulfate at 40 to 45° C. and adding 0.1 to 1.0 wt. % of an acid dyestuff, elevating the temperature of the dyeing solution to 80 to 100° C. in 30 to 60 minutes and maintaining that temperature for 30 to 60 minutes then washing and drying the goods.

Published PCT patent application WO 00/64953 describes a process for the production of micro-spheres of polymers and polymeric pigments. These products are composed mainly of polymers and copolymers containing specific functional groups to provide them specific properties and a higher affinity to colorants.

U.S. Pat. No. 5,874,091 relates to cosmetic compositions that contain particulate filler that has been combined with at least one melanin pigment.

U.S. Pat. No. 6,146,762 describes a modified porous silica, a process for its manufacture and its use in paints and as a carrier for pigments and dyes. The porous silica pores are partially filled with polyamide resins and can be employed as additives to liquid paints, as carriers for pigments and/or dyes, as anti blocking agents for folded or wound films made of olefin material and in cosmetic, pharmaceutical and/or dermatological compositions. The reference does not contemplate the use of porous polyamide particles.

U.S. Pat. No. 5,231,119 describes high porosity, spherical particles of crystalline olefin polymers that can used for preparation of master batches containing additives and pigments.

U.S. Pat. No. 5,667,580 discloses pigment compositions containing an organic pigment and transparent filler having a mean particle size less than 10 $\mu$m and a narrow particle size distribution; as well as methods of preparing the pigment compositions. The pigment compositions are useful for pigmenting high-molecular-weight organic materials; especially coating compositions, curable ink systems, plastics, as well as for use in laser marking applications. Although such pigment compositions show an excellent dispersibility and can be used as stir-in pigments when applied in paints, their pigment concentration is above 65 percent. Due to the high pigment content such compositions are expensive and need special drying and/or pulverization equipment.

Pigment compositions containing a small particle size porous filler and a pigment, and their use for preparing effect coating compositions which produce thin film finishes exhibiting strong lightness and color flop with a pronounced three dimensional effect are described in U.S. Pat. No. 5,997,627. Such pigment compositions proved to have excellent and valuable properties when applied in paints such as automotive paints. However, due to the high pigment content such compositions show an insufficient dispersibility behavior and cannot be applied directly in a one step application process into nylon fibers.

Copending provisional patent application No. 60/290,767, filed on May 14, 2001 describes pigmentary compositions comprising polyamide particles with an average particle size of below 50 $\mu$m and optionally a dye precipitate. They are useful for coloring high molecular weight material, like coatings, inks and in particular plastics like polyvinyl chloride, polyamide, polyester, polycarbonate and, especially polyamide fibers. Such compositions are highly suited for coloring textile fibers but due to their inferior light stability when compared with organic pigments they are less suited for an example for an outdoor application.

SUMMARY OF THE INVENTION

The present invention relates to pigment preparations comprised of a uniform physical blend of pigment and particulate filler, especially particulate polyamide filler. The inventive pigment preparations are useful for coloring high molecular weight material, in particular high performance thermoplastics, such as polypropylene, HDPE, polyester, polypropylene, ABS, polyamide, especially polyamide fibers.

DETAILED DESCRIPTION OF THE INVENTION

Preferably, the inventive pigment preparation is prepared by wet blending a polyamide particulate material with a pigment in an aqueous media, isolating the uniform blend for instance by filtration and drying. The isolated pigment preparation is a powder form consisting of colored particulate finely divided solid, which can be easily incorporated into a substrate like a high molecular weight material. Depending on the substrate to be colored the inventive pigment preparations are when applied finely dispersed or in a polyamide-compatible substrate partially dissolved.

The coloring agent is a pigment. Pigments are inorganic or organic, colored, white or black particulate materials that are practically insoluble in a medium in which they are incorporated. Dyes, on the other hand, dissolve in a selected medium and, in the process, lose their distinct crystal or particulate structure. The coloring agent is not a melanin or related indole derivative as described in U.S. Pat. No. 5,874,091, which is incorporated herein by reference.

In general the particulate filler is polyamide filler consisting essentially of particles having an average particle size below 50 $\mu$m, in particular in the range of from 1 to 40 $\mu$m; especially from 2 to 30 $\mu$m; most preferably in the range of from 1 to 25 $\mu$m. The desired polyamide particulate material has a relatively narrow size distribution such that 90% by number have a size below 30 $\mu$m, preferably 90% by number have a size between 1 and 25 $\mu$m. The polyamide particles can have any shape, preferably they are composed primarily of particles having a spherical shape.

Advantageously, the polyamide particulate material has a porous surface. In general, the expression "porous surface" means that there are numerous holes or pores in the surface of the polyamide particle and a porous network within the particle confines. In general, the pores mainly have a size in the range of from 0.05 to 0.6 $\mu$m; alternatively in the range from 0.05 to 0.4 $\mu$m or in the range from 0.1 to 0.4 $\mu$m. The preferred porous material is described as having an essentially spherical spongy structure in the form of a "gypsum rose". The "gypsum rose" structure is defined, in mineralogical analogy to the desert rocks thus called, as particles having a lamellar or shell-like structure whose lamellae, which grow anarchically and are connected to each other, form cavities whose geometric shapes vary between the conical and pyramidal shapes, and the apices of these geometric forms are directed toward the center of the particle. The walls of the cavities, having marked borders, generally have thickness smaller than 0.2 micron, the thickness of the middle lamella forming these walls being generally even smaller than 0.1 micron. The porous structure is advantageous because it increases the surface, interior and exterior, available for pigment attachment.

The pore size is easily measured by scanning electron microscopy. Typically, a scanning electron micrograph shows pumiceous spherical particles, which have surface pores.

Suitable polyamide fillers are in particular those composed of polymerized lauryl lactam or caprolactam, or polymerized mixtures thereof. Most preferably, the filler is a polyamide-12, a polyamide-6 or a co-polyamide-6/12 filler. Highly suitable polyamide fillers are commercially available, for example, various ORGASOL® types sold by the company Atofina.

The process by which these fillers are obtained is described in U.S. Pat. No. 4,831,061 or published European patent 303,530, the disclosures of which are hereby incorporated by reference. These polyamide particles, moreover, are known, according to their various physicochemical properties, under the name "nylon-12" or "nylon-6".

Preferably, the specific surface area of the polyamide particulate material according to this invention is above 0.1 m$^2$/g. Most preferably, the specific surface area is above 1 m$^2$/g, especially in the range from 2 to 12 m$^2$/g.

Especially suitable classes of organic pigments in the inventive pigment preparation include for example the azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigments; in particular the diketopyrrolopyrrole, quinacridone, phthalocyanine, indanthrone or iminoisoindolinone pigments.

Especially suitable classes of inorganic pigments in the inventive pigment composition are selected from the group of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides such as cerium or cadmium sulfide, cadmium sulfoselenides, zinc ferrite, bismuth vanadate and mixed metal oxides (MMO); in particular the bismuthvanadate, Fe oxides, mixed metal oxides and carbon black.

Notable pigments useful in the present pigment composition are those pigments described in The Colour Index, including the quinacridone pigments, such as C.I. Pigment Red 202, C.I. Pigment Violet 19, C.I. Pigment Red 122, C.I. Pigment Orange 48, and C.I. Pigment Orange 49; the perylene pigments, for example, C.I. Pigment Red 179; the azo condensation pigments, for example, C.I. Pigment Red 170, C.I. Pigment Red 144, C.I. Pigment Red 220 and C.I. Pigment Brown 23; the isoindolinone pigments, for example, C.I. Pigment Orange 61, C.I. Pigment Yellow 109, and C.I. Pigment Yellow 110; the diketopyrrolopyrrole pigments, for example, C.I. Pigment Red 254, C.I. Pigment Red 255, C.I. Pigment Red 264, C.I. Pigment Orange 71, and C.I. Pigment Orange 73; the copper phthalocyanine pigments, for example, C.I. Pigment Blue 15, C.I. Pigment Green 7, and C.I. Pigment Green 36; and the anthraquinone pigments, for example, C.I. Pigment Blue 60, C.I. Pigment Red 177, C.I. Pigment Yellow 147, C.I. Pigment White 6, C.I. Pigment Yellow 42, C.I. Pigment Red 101, C.I. Pigment Yellow 184 and C.I. Pigment Black 7 or a mixture thereof.

Advantageously the pigment is a small particle size pigment having an average particle size of below 0.2 $\mu$m, preferably below 0.1 $\mu$m and most preferably below 0.05 $\mu$m. Thus, preferably the pigments are in a nano particle size range.

The preparation of small particle size pigments is generally known and can be achieved for example in a direct pigmentary synthesis process using special additives, a process as for example described in U.S. Pat. No. 5,840,901, or by precipitation from concentrated sulfuric acid pigment solutions or aqueous basic solvent pigment solutions as for example described in U.S. Pat. Nos. 5,231,119 and 5,565,578, or simply by thoroughly grinding a pigment crude by a dry or wet milling process.

Advantageously, the small particle size pigment is blended with the porous filler by a wet blending process. Thus, the individual components are thoroughly mixed in a liquid media. The liquid consists preferably of water and/or a water-soluble or partially water soluble organic solvent like for example a $C_1$ to $C_5$ aliphatic alcohol. Most preferably the liquid is water.

Therefore the small particle size pigment is when blended with the particulate filler finely dispersed in the solvent or solvent/aqueous or aqueous media. Generally, the pigment concentration of such dispersion is from 1 to 30 weight percent, preferably from 1 to 10 weight percent.

Adding a pigment powder to the liquid, optionally followed by a wet milling process, or re-slurrying an aqueous pigment presscake, and optionally adding auxiliary agents like surfactants, antiflocculants, makes up the pigment dispersion.

The porous particulate filler is added to the pigment dispersion, which has a pH in the range of 4 to 8.5 and is optionally buffered. Preferably the mixture is stirred at 10 to 95° C. for 1 to 18 hours, preferably at 30 to 95° C. for 1 to 4 hours.

Typically the blending process can be followed microscopically. The wet blend can be filtered when the porous filler is pigmented due to absorption on the surface and into the pores of the filler, and a uniform blend is achieved.

Furthermore it can be advantageous to add appropriate dyestuffs for shading purposes, increasing the color strength or other properties as long as the excellent heat and light stability properties of the inventive pigment preparations are maintained.

Suitable dyes are those that are generally used for dyeing nylon fibers. They are selected from the group consisting of azo, azomethine, methine, anthraquinone, phthalocyanine, dioxazine, flavanthrone, indanthrone, anthrapyrimidine and metal complex dyes.

Many of these dyes are commercially available in the form of acid-, reactive- or metal complex dyes used for coloring wool or nylon fibers. Most appropriate dyes are in particular the anthraquinone, metal complex and azo acid dyes.

In a preferred mode, the inventive pigment preparation is prepared in any suitable equipment like a kneader, shaker or a bead mill during the pigment grinding process, preferably a vessel with a stirrer by a) stirring a pigment dispersion, optionally in the presence of an auxiliary agent and a buffer, b) adding the polyamide particulate material and stirring the suspension at a higher temperature for 1 to 6 hours to get a uniform blend, c) optionally adding a dyestuff followed by an acid and/or a metal salt and/or an organic amine to precipitate the non-migrated dye, and d) isolating the resulting pigment preparation by filtration, washing and drying.

Suitable auxiliary agents are for example anionic-, cationic- and nonionic-surface active agents such as for example the sulfonated oils, alkylaryl sulfonates, sulfated alcohols, quaternary ammonium salts of aliphatic- or alkylaryl amines or N-hetero cyclic compounds and the water-soluble polymers, copolymers and/or polymer derivatives.

Such water-soluble polymers, copolymers and/or polymer derivatives are for example polyvinylpyrrolidone, polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers such as copolymers of acrylic acid with styrene, acrylonitrile, vinylacetate, vinylphosphonate, vinylpropionate, vinylchloride, itaconic acid or maleic anhydride, or a mixture thereof. Suitable polymeric derivatives are for example ethoxylated or propoxylated fatty amines such as ethoxylated cocoalkyl, oleyl or soy alkyl amines; ethoxylated or propoxylated fatty quaternary salts such as ethoxylated cocoalkyltrimethyl ammonium chloride; ethoxylated fatty amides such as ethoxylated oleamides; alkyl-, cycloalkyl- or alkylaryl-oxypoly(ethylenoxy)ethanol, cycloalkyloxypoly (ethylenoxy)laurate or oleate, polyethylene glycol 400 laurate or oleate, alkyl-, cycloalkyl- or alkylaryl-poly (ethylenoxy)carboxylate or phosphonate. An especially preferred cycloalkyloxypoly(ethylenoxy) laurate or oleate is for example a poly(ethylenoxy)sorbitan laurate or oleate. These or other preferably water-soluble polymers, copolymers and/or polymer derivatives are known per se and are commercially available.

Thus, the inventive pigment preparations can comprise of a pigment a polyamide particulate material and optionally of a dye or a precipitate of an acid dye or a dye salt. Such products possess high color strength. They are environmentally friendly and economic because they can be isolated by filtration with a high yield.

Generally, the dried pigment preparation comprise of 1 to 45 parts by weight, preferably 20 to 45 parts by weight of a pigment and 55 to 99 parts by weight, preferably 55 to 80 parts by weight of a polyamide particulate material.

The dried pigment preparations are generally used in the form of a powder, which is incorporated into the substrate to be pigmented.

The pigment preparation consists of or consists essentially of the pigment the polyamide particulate material and optionally a dye and or its precipitate, as well as customary additives. Such customary additives include texture-improving agents and/or anti flocculating agents.

Typical texture-improving agents include fatty acids having at least 12 carbon atoms, and amides, esters or salts of fatty acids. Fatty acid derived texture-improving agents include fatty acids such as lauric acid, stearic acid or behenic acid, and fatty amines like lauryl amine, stearyl amine, oleyl amine, soja alkylamin, cocoalkyl-dimethylamine, dimethyloleylamine or dicocoalkylmethylamin. In addition, fatty alcohols or ethoxylated fatty alcohols, polyols, like aliphatic 1,2-diols or polyvinyl alcohol and epoxidized soy bean oil, waxes, resin acids and resin acid salts are suitable texture-improving agents.

Antiflocculating agents, also described as rheology improving agents or particle growth inhibitors, are well known in the pigment industry and include particularly pigment derivatives like the sulfonic acid, sulfonic acid salts or sulfonamide derivatives. Typically, they are used in a concentration of 0.5 to 8 percent based on the pigment preparation.

The customary additives are incorporated into the pigment preparation before, during or after the preparation step. Thus, the inventive pigment preparation further can contain additives in an amount of from 0.05 to 20 percent by weight, based on the colored composition.

The pigment preparations of this invention are suitable for coloring high molecular weight organic material.

Examples of high molecular weight organic materials which may be colored or pigmented with the inventive pigment compositions are cellulose ethers and esters such as ethyl cellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

The above high molecular weight organic materials may be singly or as mixtures in the form of plastics, melts or of spinning solutions, varnishes, paints or printing inks. The inventive pigment preparations are preferably employed in an amount of 0.1 to 30 percent by weight, based on the high molecular organic material to be pigmented The pigmenting of the high molecular weight organic materials with the pigment preparations of the invention is carried out for example by incorporating such a preparation, into the substrates using roll mills, mixing or grinding machines. The pigmented material is then brought into the desired final form by methods which are known per se, for example calendering, molding, extruding, coating, spinning, casting or by injection molding. It is often desirable to incorporate plastizisers into the high molecular weight compounds before processing in order to produce non-brittle moldings or to diminish their brittleness. Suitable plasticizers are for example esters of phosphoric acid, phthalic acid or sebacic acid. The plastizisers may be incorporated before or after working the composition into the polymers. To obtain different shades, it is also possible to add fillers or other chromophoric components such as organic or inorganic pigments like white, colored or black, effect, fluorescent or phosphorescent pigments, in any amount, to the high molecular weight organic compounds, in addition to the pigment preparation of this invention.

Although the new pigment preparations show a good light and heat stability it can be advantageous to apply the present compositions in the presence of commonly known and commercially available antioxidants, UV absorbers, light stabilizers, processing agents and so forth.

For pigmenting coatings, varnishes and printing inks, the high molecular weight organic materials and the inventive pigment preparations, together with optional additives such as fillers, other pigments, siccatives, light- or UV stabilizers, are finely dispersed or dissolved in a common organic solvent or mixture of solvents. The procedure may be such that the individual components by themselves, or also several jointly, are dispersed or dissolved in the solvent and subsequently all the components are mixed.

The colorations obtained, for example in plastics, filaments, coatings, varnishes or prints, have good all-round fastness properties such as an high transparency, good fastness to over-spraying, migration, heat, light, and weathering.

The pigment preparations of this invention are also suitable for use as colorants for paper, leather, inorganic materials like concrete, seeds, and in cosmetics.

Due to the chemical resistance, abrasion and scratch resistance and high melting point of the polyamide particulate material used, the new pigment preparations can be incorporated in solvent and water based paint and ink systems and also in powder coatings and UV or EB cross linking coating systems. In such systems, for example in coil coatings, external can coatings, non sliding paints for play grounds, varnishes for rubber, paints for automotives or composites and so on they are useful. Additionally, they can be applied in combination with other conventional pigments in such substrates providing unique and durable color shades.

The inventive pigment preparations are particularly suitable for coloring thermoplastics including polypropylene, polyethylene, and especially soft, medium hard and hard polyvinyl chloride. For example in soft and medium hard polyvinyl chloride very attractive, high chroma, and migration resistant coloration's can be generated.

The pigment preparations of this invention are especially suitable for the coloring of nylon articles, such as moldings or notably nylon fibers, they manifest an excellent light stability and a high heat stability.

The inventive pigment preparations can be easily blended and simply let down with nylon-6 and directly spun to fibers. Surprisingly, no pigment aggregates can be observed under the microscope in such colored fibers. Due to the outstanding dispersibility behavior or even partial or complete solubility and compatibility with nylon, the inventive pigment preparations have the great advantage versus conventional organic or inorganic pigments of no pressure build up during the spinning procedure due to a clocking up of the spinnerets by pigments or aggregates.

Therefore, with the new pigment preparations nylon fibers can be colored to obtain shades and fiber properties with a high durability and a high transparency with the great advantage of using the economic and environmentally friendly melt spinning process.

The following examples further describe embodiments of this invention. The scope of the invention is not limited to the foregoing examples. In these examples all parts given are by weight unless otherwise indicated.

The particle sizes and particle size distributions of the fillers given in the following examples are determined as described below:

Particle size distribution of the polyamide fillers is determined in accordance with the principle of Fraunhofer light diffraction. A laser beam passes through the sample and the resulting diffraction pattern is focused on a multi-element detector. Since the diffraction pattern depends, among other parameters, on particle size, particle size distribution can be calculated on the basis of the measured diffraction pattern of the sample. The cumulative volume distribution is determined using a Fraunhofer diffraction instrument, e.g. a COMPETITION/5-HELOS/KA, from SYMPATEC GmbH, D-38644 Goslar, in accordance with the instruction manual.

EXAMPLE 1

A 2 liter flask equipped with a stirrer, condenser and a thermometer is charged with 1000 ml of an aqueous pigment dispersion containing 15 grams of the anthraquinone pigment CROMOPHTAL Yellow AGR, C.I. Pigment Yellow 147, with an average particle size of below 0.1 $\mu$m as determined by electron microscopy, 0.8 grams IRGALEV A and 0.8 grams CIBAFLOW R both surface active dyeing auxiliaries from Ciba Specialty Chemicals Corp. the mixture is stirred for 10 minutes at 90–95° C. 20 grams ORGASOL 2001 UD NAT, a spherical porous polyamide-12 filler with an average particle size of 2 to 8 $\mu$m from Atofina are added. The mixture is stirred at 90–95° C. for 2 hours resulting in a yellow suspension. The yellow suspension is hot filtered and washed with water. The press cake is dried yielding a yellow pigmentary preparation.

By rubout according to ASTM method D-387-60 in a lithographic varnish (a Nuodex lead/manganese drier from Blackman Uhler Chemical Comp.), the pigmentary composition shows a saturated yellow color.

EXAMPLE 2

A 2-liter flask equipped with a stirrer, condenser and a thermometer is charged with 0.8 grams IRGALEV A and 1000 grams of C.I. Pigment Green 7 dispersion made up from 30 grams 50% aqueous presscake IRGALITE Green GLPO, a C.I. Pigment Green 7 from CIBA Specialty Chemicals. The mixture is stirred for 10 minutes at 90–95° C. 20 grams ORGASOL 2001 UD NAT powder are added. The mixture is stirred at 90–95° C. for 2 hours resulting in a green suspension. The green suspension is filtered and the presscake is washed with hot water. The presscake is dried and pulverized, yielding a green pigment preparation.

By rubout according to ASTM method D-387-60 in a lithographic varnish, the pigment preparation shows a strong saturated bright green color.

EXAMPLE 3

The procedure of Example 1 is repeated using instead of 12 grams CROMOPHTAL Yellow AGR, 7 grams of a Carbon black, type Color Black FW 200 from DEGUSSA, yielding a black pigment preparation.

By rubout according to ASTM method D-387-60 in a lithographic varnish, the pigmentary composition shows a strong black color.

EXAMPLE 4

The procedure of Example 2 is repeated using instead of CROMPHTAL Yellow AGR pigment dispersion an aqueous dispersion made up from a presscake containing 15 g IRGALITE Blue GBP, a copper phthalocyanine pigment from CIBA Specialty Chemicals with an average particle size of below 0.1 $\mu$m, yielding a strong colored blue pigment preparation.

By rubout according to ASTM method D-387-60 in a lithographic varnish, the pigmentary composition shows a strong blue color.

EXAMPLE 5

63.0 grams of polyvinyl chloride, 3.0 grams epoxidized soybean oil, 2.0 grams of barium/cadmium heat stabilizer, 32.0 grams dioctyl phthalate and 1.0 gram of the yellow pigment preparation prepared according to Example 1 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive highly saturated, highly transparent yellow shade and has excellent fastness to heat, light and migration.

EXAMPLE 6

Five grams of the pigment preparation prepared according to Example 2, 2.65 grams CHIMASORB 944LD (hindered amine light stabilizer), 1.0 gram TINUVIN 328 (benzotriazole UV absorber) and 2.0 grams IRGANOX B-215 Blend (anti-oxidant), all available from Ciba Specialty Chemicals Corporation, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 200° C. Homogeneously green colored chips are obtained.

EXAMPLE 7

In a concentration of 0.5% in nylon-6 flakes, Type BS 700 from BASF the pigment preparation prepared according to Example 1 was by a direct let down spun on the Hill Spin Line into 12 denier fibers resulting in a yellow fiber with an attractive appearance. No pressure build up during the spinning process was observed and no aggregates were noticed when the fibers were observed under the microscope.

The fiber was wrapped onto a card and submitted to a light fastness test in a Xenon arc weather-0-meter and exposed for 100 hours AATCC 16 E exposure resulting in a gray scale note of 4 (gray scale 1 to 5 means, 5: best light stability, 1: worst light stability).

Thus, the result showed that nylon-6 fibers colored by the melt spinning process with the present pigment preparation manifest an excellent heat stability and light stability.

EXAMPLE 8

The procedure of Example 7 is repeated, however, using instead of the yellow pigment preparation the green pigment preparation prepared according to Example 2, yielding green fibers showing an attractive appearance. No pressure build up during the spinning process was observed and no aggregates were noticed in the fibers when viewed under the microscope.

The fiber was wrapped onto a card and submitted to a light fastness test in a Xenon arc weather-0-meter and exposed for 200 hours AATCC 16 E exposure resulting in a gray scale note of 5.

I claim:

1. A pigment preparation comprising from 55 to 99 parts by weight of polyamide particles having an average particle size below 50 $\mu$m and 1 to 45 parts by weight of a pigment absorbed on or therein, wherein the parts by weight of the polyamide particles and pigment total 100 parts by weight and wherein the polyamide particles and pigment are combined by a wet blending process in a liquid media.

2. A pigment preparation according to claim 1 wherein the pigment preparation comprises from about 55 to 80 parts by weight of the polyamide particles and from about 20 to 45 parts by weight of a pigment.

3. A pigment preparation according to claim 1 wherein the average particle size of the polyamide particles is in the range of from 1 to 40 μm.

4. A pigment preparation according to claim 3 wherein at least 90 percent of the polyamide particles have a size below 30 μm.

5. A pigment preparation according to claim 4 wherein at least 90 percent of the polyamide particles have a size in the range of from 1 to 25 μm.

6. A pigment preparation according to claim 3 wherein the polyamide particles have a porous surface and a spherical shape.

7. A pigment preparation according to claim 6 wherein the porous surface contains pores on the surface of the polyamide particles wherein the pores on average have a diameter in the range from 0.05 to 0.6 μm.

8. A pigment preparation according to claim 5 wherein the polyamide particles have a specific surface area in the range of 0.1 to 12 $m^2/g$.

9. A pigment preparation according to claim 1 wherein the polyamide particles are a polylaurylactam, a polycaprolactam or a copolymer thereof.

10. A pigment preparation according to claim 1 wherein the pigment is selected from the group consisting of azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigment.

11. A pigment preparation according to claim 1 wherein the pigment is an inorganic pigment selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, cadmium sulfoselenides, zinc ferrite, bismuth vanadate and mixed metal oxides (MMO).

12. A pigment preparation according to claim 10 wherein the pigment is selected from the group consisting of C.I. Pigment Red 202, C.I. Pigment Violet 19, C.I. Pigment Red 122, C.I. Pigment Orange 48, C.I. Pigment Orange 49, C.I. Pigment Red 179, C.I. Pigment Red 170, C.I. Pigment Red 144, C.I. Pigment Red 220 C.I. Pigment Brown 23, C.I. Pigment Orange 61, C.I. Pigment Yellow 109, C.I. Pigment Yellow 110, C.I. Pigment Red 254, C.I. Pigment Red 255, C.I. Pigment Red 264, C.I. Pigment Orange 71, C.I. Pigment Orange 73, C.I. Pigment Blue 15, C.I. Pigment Green 7, C.I. Pigment Green 36, C.I. Pigment Blue 60, C.I. Pigment Red 177, C.I. Pigment Yellow 147, C.I. Pigment White 6, C.I. Pigment Yellow 42, C.I. Pigment Red 101, C.I. Pigment Yellow 184, C.I. Pigment Black 7 and mixtures thereof.

13. A pigment preparation according to claim 1 wherein said pigment has an average particle size of below 0.2 μm.

14. A pigment preparation according to claim 1 wherein said pigment is in a nano particle size range of below 0.05 μm.

15. A pigment preparation according to claim 1 wherein the liquid media is an aqueous media consisting of water and/or a water soluble or partially water soluble organic solvent.

16. A method for preparing a pigment preparation according to claim 1 comprising
   a) stirring a pigment dispersion in the presence of an auxiliary agent,
   b) adding the polyamide particles to the pigment dispersion and stirring at a temperature 30 to 95° C. for 1 to 4 hours to get a uniform blend,
   c) isolating the resulting pigment preparation by filtration, washing and drying.

17. A method for according to claim 16, wherein the auxiliary agent is an anionic-, cationic- or nonionic- surface active agent.

18. A method for coloring a solid or liquid substrate comprising incorporating an effective pigmenting amount of a pigment preparation according to claim 1 into said substrate.

19. A method according to claim 18 wherein the substrate is an ink, coating or plastic material.

20. A method according to claim 19 wherein the material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof.

21. A method according to claim 19 wherein the material is selected from the group consisting of polyamide, polyester, polycarbonate and mixtures thereof.

22. A method according to claim 21 wherein the material is a polyamide or polyester fiber.

23. A method according to claim 19 wherein the substrate is a polylaurylactam, a polycaprolactam or a copolymer thereof.

24. A method of claim 18 wherein the substrate is paper, leather, a solid or liquid polymeric material, mineral oil, an inorganic or a cosmetic material or a seed.

25. A method for coloring a substrate comprising applying a coating composition that contains an effective pigmenting amount of a pigment preparation according to claim 1 to said substrate.

26. A method of claim 25 wherein the coating composition is a stoving finish containing a binder selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins, diene rubbers and copolymers thereof.

* * * * *